(No Model.)

G. T. WARWICK.
ELASTIC WHEEL TIRE.

No. 441,521. Patented Nov. 25, 1890.

Witnesses:

Inventor,
George T. Warwick,
by Chapin & Co.
Att'ys

UNITED STATES PATENT OFFICE.

GEORGE T. WARWICK, OF SPRINGFIELD, MASSACHUSETTS.

ELASTIC WHEEL-TIRE.

SPECIFICATION forming part of Letters Patent No. 441,521, dated November 25, 1890.

Application filed June 30, 1890. Serial No. 357,237. (No model.)

*To all whom it may concern:*

Be it known that I, GEORGE T. WARWICK, a subject of the Queen of Great Britain, residing at Springfield, in the county of Hampden and State of Massachusetts, have invented new and useful Improvements in Vehicle-Wheels, of which the following is a specification.

This invention relates to improvements in vehicle-wheels especially adapted for velocipedes, and it particularly relates to the construction of the tire, the object being to provide a spring or elastic tire which has unusual capabilities for insuring easy riding and the avoidance of shocks and vibrations incidental to wheels of the constructions heretofore most generally observed; and the invention consists in the construction and arrangement of parts, substantially in accordance with the description hereinafter given and the terms of the subjoined claims.

In the accompanying drawings a tire constructed in accordance with this invention is illustrated.

Figure 1:
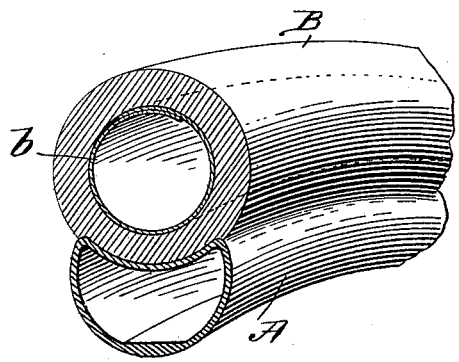
Figure 2:
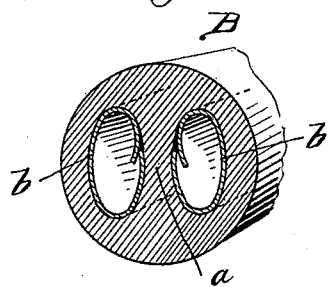
Figure 3:
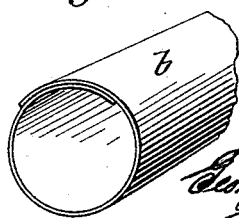

Figure 1 is a perspective view of a portion of a tired rim for a velocipede-wheel, also showing a transverse section of the same. Fig. 2 is a view somewhat similar to Fig. 1, but showing a modification in the construction of the wheel-tire. Fig. 3 is a perspective view of a portion of the tubular spring-core.

A represents the rim or felly, which in the class of wheels particularly mentioned is formed of metal and hollow and with the annular depression concave in cross-section, and B represents the tire, which is set in said depression. The tire is essentially composed of india-rubber or gutta-percha in any of their elastic compounds and is made in the form of a hollow ring or annulus having, in substance, a re-enforcing section within its annular space or chamber, which, however, is in the nature of a cushion, whereby in use the portion of the tire forming the tread will not be collapsed upon the portion forming the back. The said re-enforcing part internally or within the body of the tire may consist in part of a homogeneous section $a$ of the elastic tire-forming material spanning the said opening and dividing same into two annular chambers and extending with a greater or lesser continuity throughout the entire endless course thereof; or said re-enforcing section may consist of a tube $b$, made into ring form and inclosed within and closely fitting the inner walls of the annular space of the tire, as seen in Fig. 1, said tube being capable of a deflection generally transversely of its curved course, although clearly when the re-enforcing-wall $a$ is incorporated in the tire either or both of the annular chambers at each side thereof may contain the spring-tubes. (See Fig. 3.)

The spring-tube may be made of pen-steel or other suitable metal or material by longitudinally bending a suitable strip of the metal or material into tubular form without confining the edges, which may either merely approach or overlap and form a continuous or unsecured seam-line throughout the entire course of the tube, which is then made into ring form and in readiness to be inclosed in the molding of the tire within the elastic body thereof, or said spring-tube may be formed by a spirally-wound strip of suitable material having spring capabilities, the convolutions being abutted edge to edge or separated by a greater or lesser space. The rim being provided with the annular and transversely-concaved depression into which the tire is set conduces to form a trussing, re-enforcing, and position retaining means for the spring-tube, which, notwithstanding it is within the rubber tube, is held by the concave rim-seat from spreading at its base, and therefore it will not cripple or collapse, and under the combination and arrangement set forth a spring-tube which is very light may efficiently fulfill its function.

I here desire to state that the present improved tired vehicle-wheel should in no manner be confounded with the well-known "pneumatic tire," for it is the aim of this invention to secure a tire for the wheel-rim which is in no way dependent on the presence of the air confined therein, for in my tire the presence or non-presence of air therein is entirely immaterial.

What I claim as my invention is—

1. In a vehicle-wheel, a hollow ring of elastic india-rubber or gutta-percha, having extending entirely around and within the annular space thereof and closely fitting therein a thin metallic contractible and expansible spring-tube, combined with a rim having an an annular concave seat-depression therein for receiving and supporting the above-specified tire, for the purposes set forth.

2. A tire for a vehicle-wheel, consisting of a ring of india-rubber or similar elastic material formed with two or more openings around and within the same, with the homogeneous separating-wall and one or both of said annular spaces provided with an annularly-arranged re-enforcing metallic spring-tube, substantially as described.

GEO. T. WARWICK.

Witnesses:
WM. S. BELLOWS,
G. M. CHAMBERLAIN.